US009276256B2

(12) United States Patent
Nakayama et al.

(10) Patent No.: US 9,276,256 B2
(45) Date of Patent: *Mar. 1, 2016

(54) LITHIUM SECONDARY BATTERY AND METHOD OF MANUFACTURING SAME

(71) Applicant: Toyota Jidosha Kabushiki Kaisha, Toyota-shi, Aichi (JP)

(72) Inventors: Hideki Nakayama, Susono (JP); Hideyuki Yamamura, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 158 days.

This patent is subject to a terminal disclaimer.

(21) Appl. No.: 14/250,555

(22) Filed: Apr. 11, 2014

(65) Prior Publication Data
US 2014/0220442 A1 Aug. 7, 2014

Related U.S. Application Data

(62) Division of application No. 13/508,787, filed as application No. PCT/JP2009/069582 on Nov. 18, 2009, now Pat. No. 8,722,244.

(51) Int. Cl.
| H01M 4/52 | (2010.01) |
| H01M 4/62 | (2006.01) |
| H01M 4/13 | (2010.01) |
| H01M 4/131 | (2010.01) |
| H01M 4/1391 | (2010.01) |
| H01M 4/525 | (2010.01) |
| H01M 4/04 | (2006.01) |

(52) U.S. Cl.
CPC .............. *H01M 4/13* (2013.01); *H01M 4/131* (2013.01); *H01M 4/1391* (2013.01); *H01M 4/523* (2013.01); *H01M 4/525* (2013.01); *H01M 4/622* (2013.01); *H01M 4/0404* (2013.01); *H01M 4/0471* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| 2007/0048609 A1* | 3/2007 | Ueda et al. ............... 429/218.1 |
| 2009/0253033 A1 | 10/2009 | Hirose et al. |
| 2010/0015514 A1* | 1/2010 | Miyagi et al. ............. 429/129 |

(Continued)

FOREIGN PATENT DOCUMENTS

| CN | 101557008 | 10/2009 |
| JP | 3-112070 | 5/1991 |

(Continued)

OTHER PUBLICATIONS

International Search Report in international Application No. PCT/JP2009/069582: Mailing Date: Dec. 22, 2009.

(Continued)

*Primary Examiner* — Yoshitoshi Takeuchi
(74) *Attorney, Agent, or Firm* — Finnegan, Henderson, Farabow, Garrett & Dunner, LLP

(57) ABSTRACT

A lithium secondary battery provided by this invention has electrodes and configured in a structure in which active material layers, including active materials and binders, are held by collectors. The active material of at least one of the positive electrode and the negative electrode of the electrodes is formed from a metal compound which stores and releases lithium ions through conversion reactions. The lithium secondary battery includes a polyimide-base resin as a binder.

7 Claims, 9 Drawing Sheets

(56) References Cited

U.S. PATENT DOCUMENTS

| | | | |
|---|---|---|---|
| 2010/0092865 A1* | 4/2010 | Kanno et al. | 429/221 |
| 2012/0214063 A1 | 8/2012 | Morimoto et al. | |
| 2013/0171520 A1* | 7/2013 | Nakayama et al. | 429/211 |

FOREIGN PATENT DOCUMENTS

| | | | |
|---|---|---|---|
| JP | 3-291862 | 12/1991 | |
| JP | 10-334921 | 12/1998 | |
| JP | 11-73968 | 3/1999 | |
| JP | 11-102708 | 4/1999 | |
| JP | 2000-21412 | 1/2000 | |
| JP | 2002-124264 | 4/2002 | |
| JP | 2003-257426 | 9/2003 | |
| JP | 2008-162821 | 7/2008 | |
| JP | 2008-262829 | * 10/2008 | H01M 4/52 |
| JP | 2008-282550 | 11/2008 | |
| JP | 2009/026542 | 2/2009 | |
| JP | 2009-170384 | 7/2009 | |
| WO | WO 2008/081851 | 7/2008 | |
| WO | WO 2011/058972 | 5/2011 | |

OTHER PUBLICATIONS

English translation of JP 2008-262829, dated Oct. 30, 2008.
English translation of JP 11-102708, dated Apr. 13, 1999.
Office Action for U.S. Appl. No. 13/508,787 mailed May 29, 2013.
Office Action for U.S. Appl. No. 13/508,787 mailed Oct. 7, 2013.
Notice of Allowance and Fee(s) Due for U.S. Appl. No. 13/508,787 mailed Dec. 25, 2013.

* cited by examiner

LITHIUM SECONDARY BATTERY AND METHOD OF MANUFACTURING SAME

CROSS-REFERENCE TO RELATED APPLICATIONS

This application is a division of application Ser. No. 13/508,787, which is a national phase application of International Application No. PCT/JP2009/069582, filed Nov. 18, 2009, the contents of all of which are incorporated herein by reference.

TECHNICAL FIELD

This invention relates to a lithium secondary battery. More specifically, this invention relates to a lithium secondary battery having an electrode including active material formed from a metal compound capable of storage and release of lithium ions through a conversion reaction, and a method of manufacturing such a lithium secondary battery.

BACKGROUND ART

Lithium secondary batteries are anticipated to become high-output power sources suitable for installation in vehicles. As the negative electrode active material of such secondary batteries, typically graphite carbon, amorphous carbon or other carbon-base materials, lithium-transition metal oxides ($Li_4Ti_5O_{12}$ and other lithium titanium oxides and similar), lithium-transition metal nitrides, and similar are used. Such active materials store and release lithium ions through intercalation reactions (that is, reactions to cause inclusion of different molecules and ions between inorganic crystalline layers). However, using such active materials, lithium storage capacity is limited by the crystal structure of the material, so that dramatic increases in capacity cannot be expected. For example, when graphite carbon is used as the negative electrode active material, one Li atom is intercalated per six carbon atoms, so that the charge/discharge capacity has an upper limit of 372 mAh/g. Hence various negative electrode materials which may realize charge/discharge capacities equal to or greater than those of current negative electrode materials (for example, 1000 mAh/g or higher) have been studied.

In recent years, it has been reported that $Fe_2O_3$, CoO and other transition metal oxides, as well as $NiP_2$ and other phosphides, can function as active materials (for example, negative electrode active materials) with extremely high capacities (see for example Patent Reference 1). For example, in an electrode comprising $Fe_2O_3$ as an active material (an iron oxide-base electrode), a charge/discharge capacity of 1000 mAh/g or higher can be exhibited. Transition metal compounds such as the abovementioned have high capacities compared with conventional oxide-base materials (for example, $Li_4Ti_5O_{12}$ and other lithium-transition metal compounds) using intercalation reactions, and can attain higher capacities through the use of reduction reactions from the compound state to a simple metal.

When the transition metal compounds are electrochemically reduced, the oxygen atoms (or phosphorus atoms) which had been bonded with the transition metal react with $Li^+$ ions to form $Li_2O$ (or $Li_3P$), and the transition metal element itself becomes a simple metal. Further, upon electrochemical oxidation the $Li_2O$ (or $Li_3P$) is decomposed, returning to $Li^+$ ions. Through such electrochemical reactions, the transition metal compounds make possible reversible electrode reactions. As an example of such electrode reactions, an electrode reaction of an oxide $M_xO_y$ of a transition metal element M such as Fe, Co or similar is indicated in reaction equation (1) below. Reactions such as the abovementioned in which a transition metal compound (typically an oxide) and a lithium ion are replaced with the simple metal and lithium compounds are called conversion (type) reactions.

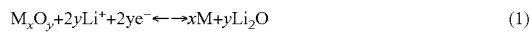

$$M_xO_y + 2yLi^+ + 2ye^- \leftrightarrow xM + yLi_2O \tag{1}$$

CITATION LIST

Patent Literature

Patent Literature 1: Japanese Patent Application Laid-open No. 2003-257426
Patent Literature 2: Japanese Patent Application Laid-open. No. 2008-162821

However, it is known that an electrode comprising as an active material a transition metal oxide such as the abovementioned (for example, an iron oxide-base electrode) has low charge/discharge reversibility resulting from electrode reactions like that of the reaction equation (1), and with respect to cycle characteristics (durability), application to secondary batteries is difficult. Specifically, the extent of expansion/contraction of the electrodes (strictly speaking, active materials) which occurs accompanying charge/discharge cycles is extremely large (compared for example with cases in which conventional carbon-base materials or lithium-transition metal compound materials are used). Consequently the conducting path (network) of $Li^+$ ions from the active material within the electrode (for example, negative electrode) to the collector can be disrupted, so that the irreversible capacity of the secondary battery comprising such a collector increases, and the cycle characteristics (durability) may decline. Further, the simple metal (metal in the reduced state) which occurs through the electrode reactions undergoes granular growth, so that the irreversible capacity of the lithium secondary battery increases, and durability may decline.

Hence it is desirable that a lithium secondary battery be provided such that, even when a transition metal compound is used as an active material, the irreversible capacity is reduced and durability can be improved. However, no such lithium secondary battery has yet been obtained. Patent Reference 2 proposes a carbon composite material in which, as the negative electrode material, the surface of mesoporous carbon or another porous carbon material is covered with $Fe_2O_3$. However, the composite material disclosed in this document does not use the conversion reactions, and is not directly related to this invention.

SUMMARY OF INVENTION

This invention was devised in the light of these problems, and has as a main object the provision of a lithium secondary battery which performs charging and discharging through conversion reactions, and which achieves both high capacity and high durability.

In order to realize the abovementioned object, a lithium secondary battery provided by this invention comprises electrodes configured in a configuration in which an active material layer, including an active material and a binder, is held by collectors. Of the electrodes, the active material of at least one of a positive electrode and a negative electrode has a metal compound which stores and releases lithium ions through conversion reactions. Here the binder is characterized in having a polyimide-base resin.

Here a "polyimide base resin" refers to a synthetic resin having a polymer backbone mainly based on imide bonds, and also including polymers (high-molecular weight compounds) having other bond types (for example amide bonds). Hence synthetic resins generally called polyamide-imide resins are also a typical example included in what are here called polyimide-base resins.

Here, "conversion reactions" refers to reactions comprising reactions which reduce a metal compound to produce a simple metal and a lithium compound, and reverse reactions, that is, reactions which oxidize the simple metal and produce the metal compound and lithium ions; the term typically refers to both the forward reaction and the reverse reaction. Hence the reaction equation (1) is a typical example included in such conversion reactions.

Further, in this Specification, a "lithium secondary battery" is a secondary battery which uses lithium ions as the electrolyte ions, and in which charging and discharging are realized through the movement of lithium ions between the positive and negative electrodes. In general, secondary batteries which are called lithium ion batteries are typical examples of the lithium secondary batteries of this Specification.

A lithium secondary battery of this invention comprises an electrode which is formed employing a metal compound, active material of which performs lithium ion storage and release through conversion reactions, and in which an active material layer of the electrode comprises a polyimide-base resin as a binder. Such a polyimide-base resin can strongly bind together particles of the metal compound forming the active agent or particles of the metal compound with conductive material (which can be added as necessary) (and moreover with the collector), and thus can greatly improve collecting properties of the electrode. Further, such a polyimide-base resin forms a strong polymer matrix, and has excellent heat resistance and mechanical strength (mechanical characteristics).

Hence with such a lithium secondary battery, because the active material is formed using a metal compound, a far greater capacity can be realized compared with active materials such as carbon-base materials and similar. Further, with such a lithium secondary battery, even when charging and discharging are repeated, changes in electrode volume accompanying expansion and contraction of the active material can be suppressed by the polymer matrix, and the conductive network within the active material layer can be preserved satisfactorily over a long period. Further, through the existence of the strong polymer matrix, granular growth of particles of the simple metal which can occur in the conversion reactions indicated in the reaction equation (1) can also be suitably suppressed. In this way, a lithium secondary battery is realized which achieves both high capacity and high durability.

In one preferred aspect of a lithium secondary battery here disclosed, the metal compound is a compound of a transition metal element which does not form an alloy with lithium.

In a lithium secondary battery thus configured, the active material is formed using a compound of the transition metal element, so that a battery with still higher capacity is realized.

Further, in a lithium secondary battery comprising an electrode having active material comprising the compound of a transition metal element, it is preferable that the metal compound be an oxide. It is still more preferable that the compound be an oxide of iron.

By using an oxide as the metal compound, lithium is stored within the electrode as a lithium oxide, and is released from within the electrode as lithium ions. Hence through a lithium secondary battery thus configured, charging/discharging reactions are preferably performed through conversion reactions, and in particular, using an oxide of iron, charging/discharging reactions through the conversion reactions are performed smoothly, and the above-described effect of the polyimide-base resin as the binder is exhibited more satisfactorily. Hence through a lithium secondary battery thus configured, a lithium secondary battery is realized which achieves still higher capacity and higher durability.

Further, lithium secondary batteries disclosed herein include both lithium secondary batteries comprising as the negative electrode an electrode with an active material comprising an metal compound, and lithium secondary batteries comprising such an electrode as the positive electrode. More preferably, a lithium secondary battery comprises the electrode as the negative electrode. Such a lithium secondary battery can have a higher operating voltage. Further, the active material of the counter electrode (that is, the positive electrode) can be selected from a broader range, which is preferable.

In another preferred aspect of a lithium secondary battery disclosed herein, the binder is included in the active material layer in a proportion of 0.5% by mass to 20% by mass, where the entire weight of the active material layer is 100% by mass.

Through a lithium secondary battery thus configured, by including the binder in the proportions, the above-described effect of the polyimide-base resin as the binder is exhibited still more satisfactorily, and a highly durable lithium secondary battery is realized.

In another preferred aspect of a lithium secondary battery disclosed herein, the metal compound is included in the active material layer as particles from 0.1 μm to 50 μm in a mean particle diameter. Through a lithium secondary battery thus configured, by providing an active material layer comprising a metal compound in such form, lithium storage and release that is, charging and discharging reactions) through the conversion reactions are performed more satisfactorily, and a lithium secondary battery having suitable battery characteristics (charge/discharge characteristics) is realized.

Another aspect of the invention provides a method of manufacturing a lithium secondary battery having an electrode formed with an active material layer, having an active material and a binder, with the active material layer being held by the collectors. This method includes the following processes. That is, this method includes the processes of preparing a paste-form active material layer formation composition including a metal compound forming an active material and an binder; applying the active material layer formation composition onto the surface of the collectors to form the active material layer; performing heat treatment of the collectors on which the active material layer is formed; and using the electrodes, including the active material layer and the collector after the heat treatment, to assemble a lithium secondary battery. As the metal compound forming the active material, a metal compound is used which stores and releases lithium ions through conversion reactions including a reaction to reduce the metal compound and produce a simple metal and a lithium compound, and a reverse reaction, oxidizing the simple metal to produce the metal compound and lithium ions. As the binder, a polyimide-base resin, or a precursor which becomes the polyimide-base resin through the heat treatment, is used.

By using a method of manufacture of a lithium secondary battery of this invention, a durable high-capacity lithium secondary battery can be provided with excellent charge/discharge characteristics, in which charging and discharging through the conversion reactions are satisfactorily performed, and in which expansion/contraction (volume change) of the active material and granular growth of the simple metal during the charging and discharging are suppressed by the binder comprising the polyimide-base resin.

In one preferred aspect of a method of manufacture of a lithium secondary battery herein disclosed, a compound of a transition metal element which does not form an alloy with lithium is used as the metal compound.

By using such a method, a lithium secondary battery with higher capacity can be provided.

In a method using a transition metal element such as the above, it is preferable that a metal oxide be used as the metal compound. It is still more preferable that an oxide of iron be used.

By using such a method, a lithium secondary battery can be provided with still higher capacity and higher durability.

In a preferred aspect of a method of manufacture of a lithium secondary battery herein disclosed, the electrode comprising an metal compound as the active material is used as the negative electrode.

By using this method, a lithium secondary battery with a higher operating voltage can be provided. Further, through this method, the active material of the counter electrode (that is, the positive electrode) can be selected from a broader range.

In another preferred aspect of a method of manufacture of a lithium secondary battery herein disclosed, the binder is combined in the active material layer formation composition such that the binder is included in the active material layer in a proportion of 0.5% by mass to 20% by mass, where the entire weight of the active material layer is 100% by mass.

By using this method, a lithium secondary battery which exhibits still more satisfactorily the above-described effect of the binder, having still more superior durability, can be provided.

In another preferred aspect of a method of manufacture of a lithium secondary battery herein disclosed, the metal compound has the form of particles from 0.1 µm to 50 µm in a mean particle diameter.

By using this method, lithium storage and release (that is, charging and discharging reactions) through the conversion reactions are performed more satisfactorily, and a lithium secondary battery having suitable battery characteristics (charge/discharge characteristics) can be provided.

In a preferred aspect of a method of manufacture of a lithium secondary battery herein disclosed, the heat treatment is performed in a non-oxidizing atmosphere at a temperature 100° C. to 500° C.

By using this method, the polyimide-base resin used as the binder can be hardened so as to enable more satisfactory exhibition of the above-described effects.

A lithium secondary battery herein disclosed, or a lithium secondary battery manufactured by one of the methods herein disclosed, is a battery which can achieve both higher capacity and higher durability (cycle characteristics), as described above, and thus is suitable as a lithium secondary battery for installation in vehicles. For example, a battery module in which a plurality of the lithium secondary batteries is connected in series, such batteries can be suitably used as the power source of a motor (electric motor) in an automobile or other vehicle. Hence through this invention, a vehicle can be provided comprising one of the lithium secondary batteries herein disclosed (or lithium secondary batteries manufactured by one of the methods herein disclosed).

DESCRIPTION OF EMBODIMENTS

Figure 1:
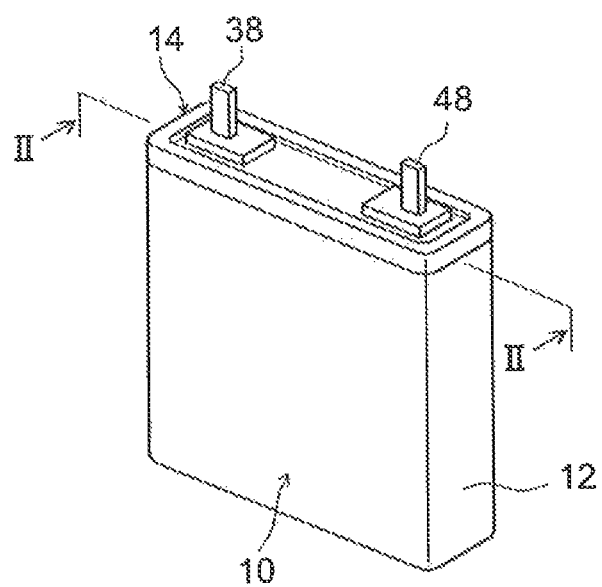
FIG. 1 is a perspective view schematically showing the outer shape of a lithium secondary battery of one embodiment.

Below, a preferred embodiment of the invention is explained referring to the drawings. In this Specification, matters other than those matters stated in particular and which are matters necessary to implement this invention can be understood to the design matters for a person skilled in the art based on the prior art in this field. This invention can be implemented based on the contents disclosed in this specification and technical common knowledge in this field. Dimensional relationships in the drawings (lengths, widths, thicknesses, and similar) not reflect actual dimensional relationships. Further, members and portions which perform the same action are assigned the same symbols, and redundant explanations are omitted or simplified.

The technology disclosed herein can be applied to various lithium secondary batteries comprising electrodes with active material formed from metal compounds which can store and release lithium ions through conversion reactions. In these electrodes, as electrode reactions during charging/discharging (that is, during storage and release of lithium ions), reactions to reduce the metal compounds and generate simple metals and lithium compounds, and the reverse reactions, that is, reactions to oxidize the simple metals and again produce the metal compounds and lithium ions, are performed. The reactions comprising these forward reactions and reverse reactions (typically including both forward and reverse reactions) are called conversion (type) reactions.

As the metal compounds, as explained above, a metal compound which can store and release lithium ions through conversion reactions is appropriate. As such a metal compound, a compound of a transition metal element which does not form an alloy with lithium is preferable; examples are oxides, phosphides and similar of such elements. It is preferable that an oxide be used. Preferred examples of transition metal elements which do not form alloys with lithium (Li) include for example iron (Fe), cobalt (Co) and nickel (Ni). Oxides of such transition metal elements store (or insert) lithium ions ($Li^+$) as lithium oxides ($Li_2O$) through the rightward reaction in the reaction equation (1) below, and on the other hand release (or dissociate) lithium ions through the reverse reaction (that is, the leftward reaction in the reaction equation (1) below). By this means, the transition metal oxide can satisfactorily function as an electrode active material.

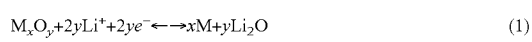

$$M_xO_y + 2yLi^+ + 2ye^- \leftrightarrow xM + yLi_2O \qquad (1)$$

As the metal oxide, it is still more preferable that an oxide of iron be used. As such an oxide of iron, a plurality of types of oxides of iron, such as for example iron oxide (FeO; also called ferrous oxide), iron sesquioxide ($Fe_2O_3$; also called ferric oxide), and triton tetraoxide ($Fe_3O_4$), may be used. It is particularly preferable that an oxide of iron including at least crystals of $Fe_2O_3$ be used. No limitations in particular are placed on the $Fe_2O_3$ crystal phase, but a typical phase is the corundum structure $\alpha$-$Fe_2O_3$ phase. The existence of $Fe_2O_3$ crystals can for example generally be confirmed by X-ray diffraction (XRD) measurements. It is preferable that in the XRD spectra, the oxide of iron with the higher diffraction intensity originating in $Fe_2O_3$ be used as the metal compound. By providing an electrode with active material comprising such an iron oxide, a battery with high capacity and exhibiting satisfactory charge/discharge characteristics (durability) can be realized.

It is preferable that in the electrode disclosed herein, with active material formed from an metal compound, the metal compound (for example, a transition metal oxide such as those described above) be able to take particulate form. As such an electrode, for example a configuration is appropriate in which an active material layer comprising the metal compound in powder form (for example $\alpha$-$Fe_2O_3$ powder) and a binder, described below (and, as necessary, a usable conductive material) (preferably an active material layer comprising the transition metal oxide as the main component, that is, a component accounting for 50% by mass or greater) is held by a collector.

As the metal compound powder (preferably transition metal oxide powder, for example $Fe_2O_3$ powder), a powder with a mean particle diameter in the range 0.1 μm to 50 μm is appropriate. A powder with a mean particle diameter preferably in the range 1 μm to 30 μm, and still more preferably in the range 1 μm to 20 μm, such as for example 10 μm±5 μm, can be used. Using a metal compound powder with such a mean particle diameter, a lithium secondary battery exhibiting satisfactory charge/discharge characteristics (cycle characteristics) can be realized. Using a metal compound powder with a mean particle diameter which greatly exceeds 50 μm, the surface area is reduced and an adequate reaction area cannot be secured; in addition, the reversibility of the reactions indicated in the reaction equation (1) may be diminished, so that satisfactory cycle characteristics cannot easily be achieved. Using a metal compound powder with a mean particle diameter which is much smaller than 0.1 μm, for example there is a tendency to clump when adjusting the composition for active material layer formation to form the active material layer, and in addition to the difficulty with handling, it is difficult to form a satisfactory active material layer. Regarding the mean particle diameter of the metal compound powder, a laser diffraction type particle size distribution measurement apparatus based on a dynamic light scattering method can be used to calculate the particle diameter at 50% by weight on the particle diameter accumulation curve (that is, the median diameter, D50) as the mean particle diameter.

As the amount of the active material, comprising the metal compound, included in the active material layer, as explained above, 50% by mass or greater is appropriate where the total weight of the active material layer is 100% by mass. It is preferable that the amount be 70% by mass or greater, and still more preferable that the amount be from 80% by mass to 90% by mass.

The technology disclosed herein is characterized in that both an active material comprising an metal compound, and a polyimide-base resin as a binder included in the active material layer, are comprised. Here, as explained above, "polyimide-base resin" refers to a synthetic resin having a polymer backbone mainly based on imide bonds, that is, a high-molecular weight compound in which unit imide bonds are mainly repeated, and also includes polymers having other types of bonds (for example amide bonds). Hence what are here called polyimide-base resins include polyimide resins, and synthetic resins generally called polyamide-imide resins are also typical examples included in what are here called polyimide-base resins.

Such resin materials can strongly bind together particles of the metal compound forming the active material, or particles of the metal compound and conductive material which is used as necessary as well as the collector, to realize strong adhesion, so that collecting properties within the electrode thus obtained can be greatly improved. Further, when the active matter layer is heat-treated and formed, such resin materials are hardened and form a strong polymer matrix, and have excellent heat resistance and mechanical strength (mechanical characteristics). Hence when such resin materials are used as a binder, in an electrode (for example a negative electrode) comprising active material including such a binder, even when battery charging and discharging are repeated, the components forming the active material layer are bound together within the polymer matrix, and the initial structure (the polymer matrix) can be maintained in this way, volume changes of the electrode accompanying expansion and contraction of the active material can be suppressed, and even when volume changes occur accompanying expansion and contraction of the active material, contact between components forming the active material layer (and between these constituent components and the collector) is maintained, and the conductive network within the active material layer (and between the active material layer and the electrode) can be satisfactorily preserved. Further, through the existence of the strong polymer matrix, granular growth of particles of the simple metal which may occur in the electrode reactions indicated by the reaction equation (1) can be suitably suppressed.

Hence by providing an electrode which comprises such a binder in the active material layer, a battery with high capacity and exhibiting satisfactory cycle characteristics (durability) can be realized.

As a suitable polyimide-base resin for such a binder, various examples can be given with different monomer types and average molecular weights (for example the number-average molecular weight), but resins can be used without any limitations in particular imposed, so long as a strong polymer matrix can be formed while suitably absorbing volume changes accompanying expansion and contraction of the active material comprising the metal compound in charge/discharge reactions. It is preferable, from the standpoint of satisfactory electron mobility properties, that an aromatic ring be present in the molecular chain, that is, that an aromatic group polyimide or aromatic group polyamide-imide be used. As the average molecular weight, for example a resin with a number-average molecular weight (Mn) of $5 \times 10^3$ to $30 \times 10^3$ (for example $10 \times 10^3$ to $20 \times 10^3$) can be suitably used. No limitations in particular are imposed on the glass transition point, but in order to simultaneously achieve heat resistance of the resin after hardening and ease of heat treatment, discussed below, for example a resin with a glass transition point of 250° C. to 320° C. can be suitably used. As the polyimide-base resin, a single type may be used, or a blend of two or more types may be used.

As the binder, a precursor of a polyimide base resin may also be used. One example is a polyamide acid (also called a polyamic acid), which is a precursor of a polyimide resin. This is because by heat treating such a precursor (for example, a polyamide acid), the precursor undergoes dehydration synthesis (that is, imidization), forming imide bonds, to become a polyimide-base resin. Hence as the binder a composition for active material layer formation using a precursor of a polyimide-base resin can be applied onto the collector, and by performing heat treatment, a polyimide-base resin forming a strong polymer matrix is obtained in the active material layer formed on the collector. The imidization rate (the molar percent of the polyimide produced relative to the precursor) of the polyimide-base resin can be sufficient that a strong polymer matrix be formed which suitably absorbs volume changes accompanying expansion and contraction of the active material comprising the metal compound in charge/discharge reactions. For example, in the case of a polyimide resin, an imidization rate of 60% or higher is appropriate, and a rate of 80% or higher is preferable. A polyimide resin with an imidization rate of 80% or higher can for example be obtained by heat treatment for approximately 1 hour or longer, at a temperature of 100° C. to 400° C., of an N-methyl-2-pyrolidone (NMP) solution of a polyamide acid. More specifically, when for example heat treatment is performed at 350° C., upon performing heat treatment for approximately 1 hour the imidization rate is approximately 80%, and upon heat treatment for approximately 3 hours the imidization rate can be approximately 100%.

As the amount of binder comprising an polyimide-base resin included in the active material layer, from 0.5% by mass to 20% by mass is suitable, where the entire weight of the active material layer is 100% by mass; the amount is preferably from 0.5% by mass to 10% by mass, and still more preferably from 1% by mass to 10% by mass, and may for example be from 3% by mass to 8% by mass. It is preferable that the binder be formed from the polyimide-base resin, but for example components other than such a resin material, such as for example cellulose-base polysaccharides, elastomers or similar, may also be comprised. In other words, it is preferable that the binder be mainly based on (have as the main component) an polyimide-base resin, accounting for 50% by mass or more of the entirety of the binder, preferably accounting for 80% by mass or more, and still more preferably accounting for 90% by mass to 100% by mass.

As a collector to which is applied an active material layer comprising an active material and binder, a conductive member having materials and shape similar to those of a collector of an electrode for a general lithium secondary battery can be used. For example, a rod-shape member, plate-shape member, sheet-shape (foil shape) member, mesh member, or similar mainly based on copper (Cu), aluminum (Al), titanium (Ti), stainless steel, or another conductive material (typically a metal material), can be used. Because of the ease of forming the active material layer and the ease of application in high-capacity batteries, it is preferable that a sheet-shape conductive member (typically a metal foil) be used as the collector. No particular limitations are imposed on the thickness of this sheet-shape base, but in consideration of the battery capacity density and the collector strength, it is preferable that the thickness be approximately in the range from 5 μm to 200 μm (and more preferably from 10 μm to 50 μm).

In forming the active material layer, a conductive material can be included in the active material layer as necessary. As such a conductive material, in general carbon black (for example acetylene black), graphite powder, or another carbon material can suitably be used, similarly to the conductive materials in the electrodes of general lithium secondary batteries. While no limitations in particular are imposed, the amount of conductive material used relative to the entirety of the active material layer (the content) can for example be from 1% by mass to 20% by mass (preferably from 5% by mass to 15% by mass).

An active material layer comprising each of the components is formed by applying a paste-form composition for active material layer formation comprising each of the components onto the collector, and performing heat treatment. The composition for active material layer formation can be prepared by dispersing or dissolving each of the components (that is, the metal compound, binder, and conductive material) in an appropriate solvent. As such a solvent, an organic solvent can be suitably used. Examples include N-methyl-2-pyrolidone (NMP), methylethyl ketone, and similar. The composition for active material layer formation may also comprise components other than the above-described components.

A lithium secondary battery disclosed herein is characterized in comprising an electrode configured with active material, comprising a binder and active material formed from a metal compound such as those described above which store and release lithium ions through conversion reactions, held by a collector, and is characterized in that the binder comprises a polyimide resin and/or a polyamide-imide resin. Hence so long as an object of this invention can be achieved, other additional details of the configuration, such as for example the details or compositions of other constituent materials and members of the battery, can be decided arbitrarily in the light of various standards, and materials and members similar to those in lithium secondary batteries of the prior art can be used.

For example, when using as the negative electrode an electrode comprising an binder and an active material comprising an metal compound, as the counter electrode (that is, the positive electrode), a configuration in which a positive electrode active material layer comprising an active material which can reversibly store and release lithium (Li), a binder, and a conductive material which can be used as necessary (preferably an active material layer comprising the active material as the main component, that is, as the component accounting for 50% by mass or more), is held by the collector. As the positive electrode collector, a rod-shape member, plate-shape member, foil-shape member, mesh member, or similar, mainly based on aluminum, nickel, titanium, stainless steel, or similar, can be used.

As the positive electrode active material, layered-structure oxide-base active materials, spinel-structure oxide-base active materials, and similar, used in general lithium secondary batteries (typically in lithium ion secondary batteries), can suitably be used. Representative examples of such active materials include lithium nickel-base oxides, lithium cobalt-base oxides, lithium manganese-base oxides, and other lithium-transition metal oxides. Here, a lithium nickel-base oxide means, in addition to an oxide having as constituent metal elements lithium (Li) and nickel (Ni), an oxide including as a constituent metal element at least one other type of metal element other than Li and Ni (that is, a transition metal element and/or typical metal element other than Li and Ni), in a proportion, as an atomic number equivalent, approximately equal to or less than that of Ni (typically in a proportion smaller than that of Ni), metal elements other than Li and Ni can be, for example, one type, or two or more types, of metal elements selected from the group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). Similar meanings are used for lithium cobalt-base oxides and lithium manganese-base oxides.

Examples of conductive materials which can be included in the positive electrode active material layers include carbon black (for example acetylene black), graphite powder and other carbon materials, nickel powder, and other conductive metal powders. Examples of binders included in such active material layers include polyvinylidene fluoride (PVdF), polytetrafluoroethylene (PTFE), carboxymethyl cellulose (CMC), styrene butadiene rubber (SBR), and similar. While no limitations in particular are imposed, the amount of conductive material used relative to the entirety of the positive electrode active material layer (the content) can for example be from 1% by mass to 20% by mass (and preferably from 5% by mass to 15% by mass). Further, the amount of conductive material used relative to the entire 100% by mass of the positive electrode active material layer (the content) can for example be from 1% by mass to 20% by mass (and preferably from 5% by mass to 15% by mass). The amount of binder used relative to the entirety of the positive electrode active material layer can for example be from 0.5% by mass to 10% by mass.

As the electrolytic solution of a lithium secondary battery disclosed herein, a solution similar to non-aqueous electrolytic solutions known for use as the electrolytic solutions of general lithium secondary batteries can be used without any limitations in particular. Such a non-aqueous electrolytic solution typically has a composition comprising a supporting salt (supporting electrolyte) in a non-aqueous solvent. As such a non-aqueous solvent, one type, or two or more types, selected from non-aqueous solvents which can be used in general lithium secondary batteries can be used. For example, such aprotic solvents as carbonates, esters, ethers, nitriles, sulfones, lactones, and similar can be used. Examples include ethylene carbonate (EC), propylene carbonate (PC), diethyl carbonate (DEC), dimethyl carbonate (DMC), ethylmethyl carbonate (EMC), and similar. As the supporting salts, one type, or two or more types, selected from among various lithium salts which are known to be able to function as supporting salts in the electrolytic solution of a lithium secondary battery can be used. Examples include $LiPF_6$, $LiBF_4$, $LiN(SO_2CF_3)_2$, $LiN(SO_2C_2F_5)_2 LiCF_3SO_3$, $LiC_4F_9SO_3$, $LiC(SO_2CF_3)_3$, $LiClO_4$, and similar. In particular, it is preferable that lithium hexafluorophosphate ($LiPF_6$) be used. No limitations are imposed on the concentration of the supporting salt, and for example a concentration similar to that of the electrolytic solution used in general lithium secondary batteries can be used. Normally a non-aqueous electrolytic solution comprising a supporting salt at a concentration of approximately 0.1 to 5 mol/L, (for example approximately 0.8 mol/L, to 1.5 mol/L) is preferable.

Next, a typical example of a method of manufacture of a lithium secondary battery disclosed herein is explained.

First, an electrode characterizing the lithium secondary battery is manufactured. That is, an electrode is manufactured with a configuration in which an active material layer, comprising a binder and an active material formed from a metal compound which stores and releases lithium ions through conversion reactions, is held by a collector. In order to manufacture this electrode, first the metal compound forming the active material of the electrode, such as for example $Fe_2O_3$ or another transition metal oxide (typically in powder form), as described above, is prepared. Further, a binder comprising (preferably, mainly comprising) a polyimide-base resin, or a binder comprising a polyamide acid which is a precursor of the polyimide resin, is prepared. Moreover, a conductive material as described is prepared as necessary.

Next, as the solvent, for example NMP is prepared; the active material, binder, and conductive material are each added in combination ratios as described above to the solvent, and a prescribed method is used for stirring and mixing, to prepare a composition for active material layer formation in slurry form (or paste form).

Next, the composition for active material layer formation is applied onto the collector for example, copper foil) as described above, and after drying is rolled to a prescribed thickness. In this way an active material layer prior to heat treatment can be formed. The drying is performed mainly to remove the solvent from the active material layer, and is executed wider temperature conditions of for example 60° C. to 120° C. (typically from 80° C. to 100° C.).

Next, heat treatment of the active material layer formed on the collector prior to heat treatment is performed. This heat treatment is performed mainly in order to heat (sinter) and harden the polyimide-base resin comprised by the binder or the precursor of a polyimide-base resin (to form the polymer matrix). This heat treatment can be performed in a non-oxidizing atmosphere. As the non-oxidizing atmosphere, for example vacuum, or an atmosphere of an inert gas such as nitrogen ($N_2$), argon (Ar) or similar, is preferable. A reducing atmosphere, such as for example a hydrogen ($H_2$) atmosphere, may also be used. As the temperature of the heat treatment, a temperature approximately equal to or higher than the temperature of the drying, which is moreover equal to or below the temperature of decomposition of the polyimide-base resin, is suitable. As such a temperature, for example from 100° C. to 500° C. is suitable. It is preferable that heat treatment be performed at a temperature higher than the glass transition point (Tg) of the polyimide-base resin. By performing heat treatment at such a temperature, the binder can be thermally fused to the metal compound particles of the active material and to the collector. In this way, the polyimide-base resin is hardened and the active material layer is formed, and moreover adhesion between the active material layer and the collector can be further improved, so that the collector network within the electrode can be further strengthened, and the collecting properties within the electrode can be greatly improved. Depending on the type of polyimide-base resin used, the temperature can appropriately be set higher than the glass transition point of the polyimide-base resin (for example 250° C. to 320° C.); for example from 200° C. to 500° C. is suitable, from 250° C. to 450° C. is preferable, and from 300° C. to 350° C. is still more preferable.

Next, the collector holding the active material layer obtained by performing the heat treatment is used as an electrode to assemble a lithium secondary battery together with other battery constituent members. Specifically, the electrode comprising the active material layer, with the active material comprising the metal compound and the binder comprising the polyimide-base resin, and the counter electrode are accommodated in an appropriate container (a metal or resin housing, a pouch member comprising laminated film, or similar) together with a non-aqueous electrolytic solution as mentioned above, to construct the lithium secondary battery. In a representative configuration of a lithium secondary battery disclosed herein, a separator is interposed between the positive electrode and the negative electrode. As the separator, a member similar to a separator used in general lithium secondary batteries can be used, and no particular limitations are imposed. For example, a porous sheet comprising polyethylene (PE), polypropylene (PP), polyester, cellulose, polyamide, or a similar resin, or unwoven cloth, or similar can be used. No limitations in particular are imposed on the shape of the lithium secondary battery (the external shape of the container), and for example a cylindrical shape, square shape, button shape, or similar can be used.

Figure 2:
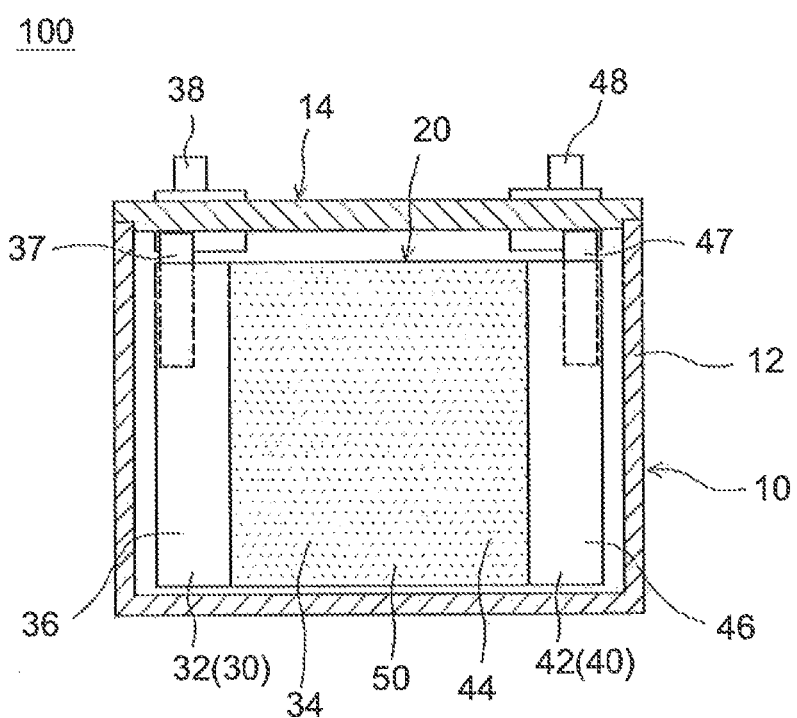
FIG. 2 is a longitudinal cross-sectional view along line II-II in FIG. 1.

An example of one configuration of a lithium secondary battery provided by this invention is shown in FIG. 1 and FIG. 2. As shown in FIG. 1 and FIG. 2, this lithium secondary battery 100 has a configuration in which an electrode assembly 20, provided with a positive electrode 30 and negative electrode 40, is accommodated, together with a non-aqueous electrolytic solution, not shown, in a battery case 10 capable of accommodating the electrode assembly.

As shown in FIG. 1, the battery case 10 comprises a square-cornered case body 12 having a box shape with a bottom and an open upper-face portion, and a lid 14 which closes the opening portion. The flat-shape electrode assembly (wound electrode assembly 20) and non-aqueous electrolytic solution can be accommodated within this case body 12 from the opening portion. The lid 14 is provided with a positive electrode terminal 38 and a negative electrode terminal 48 for connection to outside equipment; portions of these terminals 38 and 48 protrude on the surface side of the lid 14. As shown in FIG. 2, portions of the external terminals 38 and 48 are respectively connected to an internal positive electrode terminal 37 and an internal negative electrode terminal 47 within the case body 12.

As shown in FIG. 2, in the electrode assembly 20, a positive electrode sheet 30, having a positive electrode active material layer 34 on a positive electrode collector 32 in a long sheet shape, and a negative electrode sheet 40, configured with a negative electrode active material layer 44 comprising a metal compound (for example an oxide of iron) provided on a negative electrode collector (for example copper foil) 42 in a long sheet shape, are stacked and wound together with two long sheet-shape separators 50, with the wound electrode assembly 20 thus obtained crushed from the side face directions and squashed into a flat shape.

The wound positive electrode sheet 30 comprises a positive electrode active material layer unformed portion 36, in which the positive electrode active material layer 34 is not formed at one end portion along the longitudinal direction, exposing the positive electrode collector 32. The wound negative electrode sheet 40 also comprises a negative electrode active material layer unformed portion 46, in which the negative electrode active material layer 44 is not formed at one end portion along the longitudinal direction, exposing the negative electrode collector 42. The internal positive electrode terminal 37 is bonded to the positive electrode active material layer unformed portion 36 of the positive electrode collector 32, and the internal negative electrode terminal 47 is bonded to the negative electrode active material layer unformed portion 46 of the negative electrode collector 42, and these are electrically connected to the positive electrode sheet 30 or negative electrode sheet 40 of the wound electrode assembly 20 formed into a flat shape. The positive and negative electrode terminals 37 and 47 and the positive and negative electrode collectors 32 and 42 are respectively bonded by for example ultrasonic welding, resistive welding, or similar.

When an electrode comprising an active material of an metal compound and a binder with an polyimide-base resin is used as the positive electrode of a lithium secondary battery, as the negative electrode active material of the counter electrode, for example graphite, an Sn alloy, an Si alloy, or similar can be used.

Below, experimental examples of the invention are explained; however, the examples are not intended to limit the invention to such specific examples.

(Manufacture of an Electrode Comprising an Oxide of Iron as the Active Material)

As the metal compound forming the active material, a commercially marketed $Fe_2O_3$ powder material (manufactured by Rare Metallic Co., Ltd., mean particle diameter 10 μm) was used. As the binder, a polyamide-imide resin ("Vylomax" (registered trademark) HR-11NN, manufactured by Toyobo Co., Ltd.), which is a typical example of a polyimide-base resin, was prepared. As a conductive material, acetylene black ("Denka Black" (registered trademark) HS-100, manufactured by Denki Kagaku Kogyo K.K.), was also prepared. By combining the $Fe_2O_3$ powder material, conductive material, and binder with a prescribed solvent (here, NMP) such that the weight ratios were 85:10:5, the composition for active material layer formation was prepared. The composition was applied with a doctor blade onto one face of copper foil of thickness 10 μm such that the solid fraction equivalent of the applied amount was 1.7 mg/cm$^2$, and after drying for 30 minutes at 80° C., pressing was performed. Then, the copper foil on which was formed the active material layer prior to heat treatment was subjected to heat treatment for 2 hours at a temperature of 350° C. in an argon (Ar) atmosphere. In this way, an electrode having an active material layer comprising $Fe_2O_3$ and a polyimide-base resin (hereafter also simply called an "iron oxide-base electrode"), which is an active material layer of thickness 10 μm on one face of copper foil the collector), was obtained.

(Preparation of the Electrolytic Solution)

Lithium hexafluorophosphate ($LiPF_6$) as a supporting salt was dissolved at a concentration of approximately 1 mol/L in a mixed solvent of ethylene carbonate (EC), dimethyl carbonate (DMC) and ethylmethyl carbonate (EMC) in a volume ratio of 3:3:4, to prepare the electrolytic solution.

(Fabrication of a Button Cell)

Figure 3:
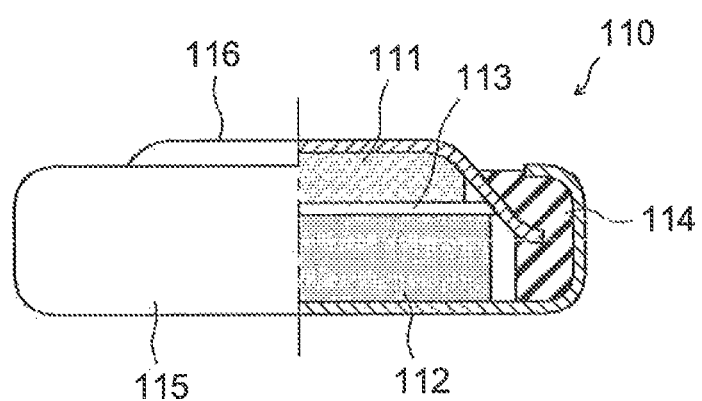
FIG. 3 is a partial cross-sectional view schematically showing a button cell manufactured for use in cycle characteristic evaluation.

A circular shape of diameter approximately 16 mm was punched out from the iron oxide-base electrode, and an electrode for testing, comprising approximately 2.5 mg of the $Fe_2O_3$ powder material, was fabricated. This electrode for testing (working electrode), metallic lithium (using metallic Li foil of diameter 19 mm and thickness 0.15 mm) as the counter electrode, a separator (a sheet formed by laminating so that a polypropylene (PP) sheet was enclosed between polyethylene (PE) sheets which are porous polyolefin sheets, of diameter 22 mm and overall thickness 0.02 mm), and the electrolytic solution, were incorporated into a stainless steel container to construct a button cell 110 (half-cell for evaluation of charge/discharge performance), shown in FIG. 3, of diameter 20 mm and thickness 12 mm (type 2032). In FIG. 3, the symbol 111 denotes the working electrode (electrode for testing), the symbol 112 denotes the counter electrode, the symbol 113 denotes the separator impregnated with the electrolytic solution, the symbol 114 denotes a gasket, the symbol 115 denotes the container (counter electrode terminal), and the symbol 116 denotes the lid (working electrode terminal). Below, the button cell manufactured as above was called Sample 1.

Next, polyvinylidene fluoride (PVdF) ("Kureha KF Polymer #1120" manufactured by Kureha Corp.) was prepared as the binder. The binder comprised by the iron oxide-base electrode in the Sample 1 was changed from the polyimide-base resin to the PVdF; otherwise exactly the same procedure as in the Sample 1 was used to fabricate a button cell. The button cell obtained in this way was called Sample 2.

(Evaluation of Cycle Characteristics)

Figure 4:
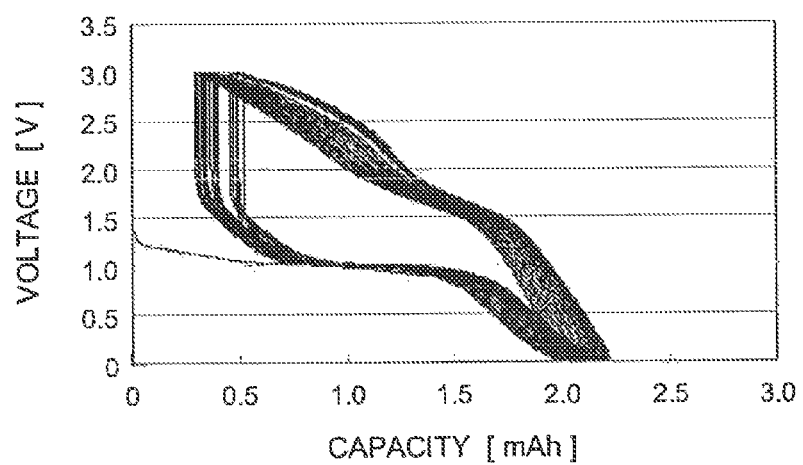
FIG. 4 shows the charge/discharge curve for Sample 1 of a practical example.

Using the Sample 1, an operation was performed (discharging) to cause storage of Li in the electrode for testing at a constant current of 0.1 C until the interelectrode voltage between the working electrode and the opposing voltage becomes 0.01 V (lower-limit voltage), and then an operation was performed (charging) to cause release of Li at a constant current of 0.1 C until the interelectrode voltage became 3.0 V (upper-limit voltage). After this initial charge/discharge, charging/discharging at a constant current of 0.2 C between the lower-limit voltage of 0.01 V and the upper-limit voltage of 3M V was repeated for 50 cycles. Charge/discharge curves for each cycle appear in FIG. 4. In FIG. 4, the horizontal axis indicates capacity (mAh) and the vertical axis indicates the interelectrode voltage (V). The proportion of the capacity after execution of each of the cycles from the second cycle to the 50th cycle to the capacity after the first cycle (the initial capacity) was calculated as a capacity retention rate (%). These results are shown in FIG. 6 as cycle characteristics.

Performance evaluations similar to those for the Sample 1 were performed for the Sample 2 as well. Charge/discharge curves for Sample 2 appear in FIG. 5, and the cycle characteristics appear in FIG. 6.

Figure 6:
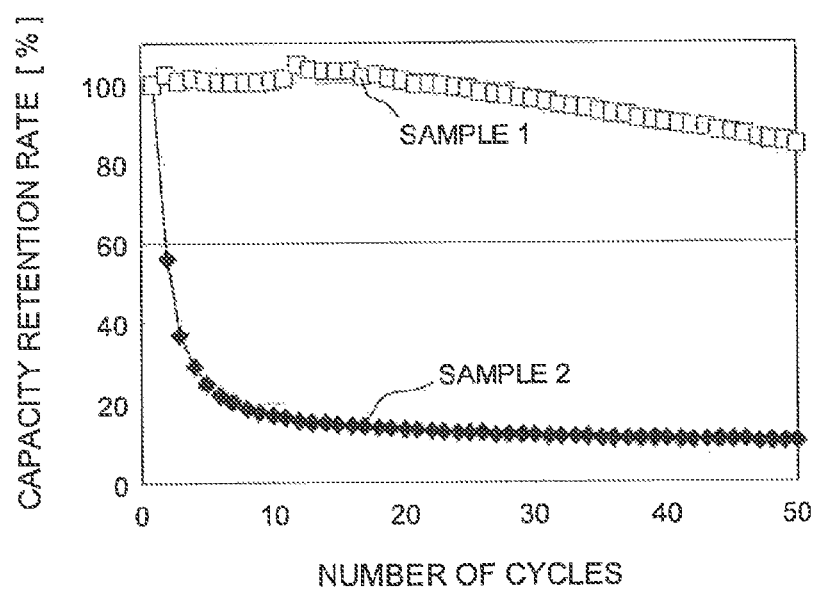
FIG. 6 shows the cycle characteristics of Sample 1 and Sample 2 of the practical example.

In the case of the Sample 1, as shown in FIG. 4 and FIG. 6, the charge/discharge curves for the cycles are similar, and no prominent differences are seen. Further, the capacity retention rate for the Sample 1 declines gradually with each cycle, but the extent of the decline is small, and even after the execution of 50 cycles the capacity retention rate is 80% or higher.

Figure 5:
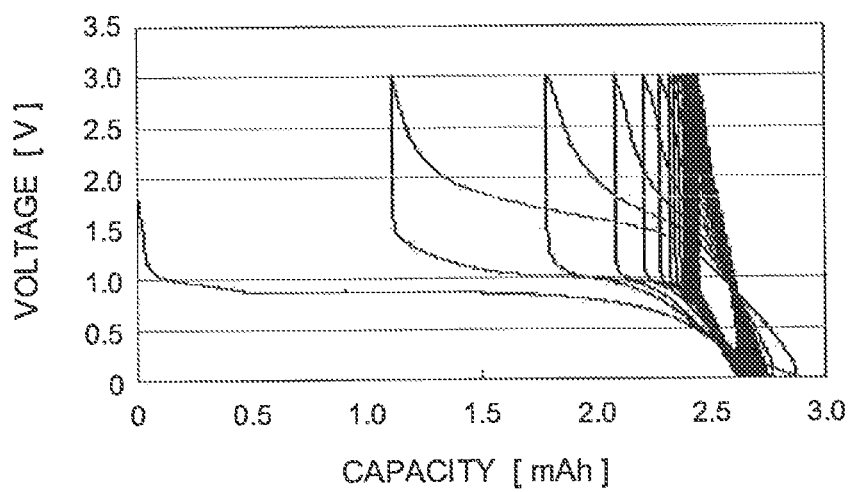
FIG. 5 shows the charge/discharge curve for Sample 2 of the practical example.

On the other hand, in the case of the Sample 2, as shown in FIG. 5 and FIG. 6, the charge/discharge curves for the cycles change greatly up to the tenth cycle, and the capacity retention rate drops to 60% or lower at the second cycle, and by the tenth cycle has fallen to 20% or lower. Thereafter the value converged between approximately 15% and 18%.

From the above results, it was confirmed that Sample 1, comprising an electrode which used a polyimide-base resin as a binder, had superior cycle characteristics (durability) compared with Sample 2 using PVdF as the binder.

(X-Ray Diffraction Measurements of the Active Material Layer)

X-ray diffraction (XRD) measurements of the active material layers in the sample 1 were performed after discharge in the first cycle (that is, during Li storage) and after discharge in the 50th cycle. During discharge of this Sample 1, through the reaction equation (1). Li is stored as lithium oxide ($Li_2O$), and simple Fe is produced. From the peak at the diffraction angle $2\theta=44.6°$ in the XRD chart obtained from these XRD measurements, the Scherrer equation was used to calculate the size of Fe crystallites (the maximum aggregate which can be regarded as a single crystal) which can exist in the active material layer. These XRD measurement results appear in FIG. 7, and calculated crystallite sizes are indicated in Table 1.

For the Sample 2 also, similarly to the Sample 1, XRD measurements of the active material, layer during storage of Li in the first cycle and during storage of Li in the 50th cycle were performed. These XRD measurement results are shown in FIG. 8, and the calculated crystallite sizes are indicated in Table 1.

TABLE 1

| | Fe crystallite size (Å) | |
|---|---|---|
| | Sample 1 | Sample 2 |
| First cycle | 15 | 15 |
| 50th cycle | 23 | 45 |

Figure 7:
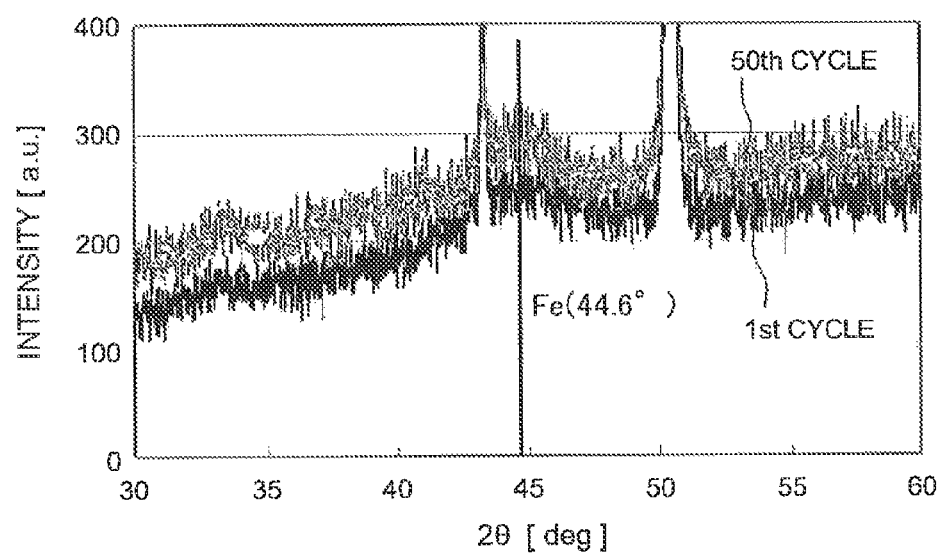
FIG. 7 shows X-ray diffraction measurement results for Sample 1 of the practical example.
Figure 8:
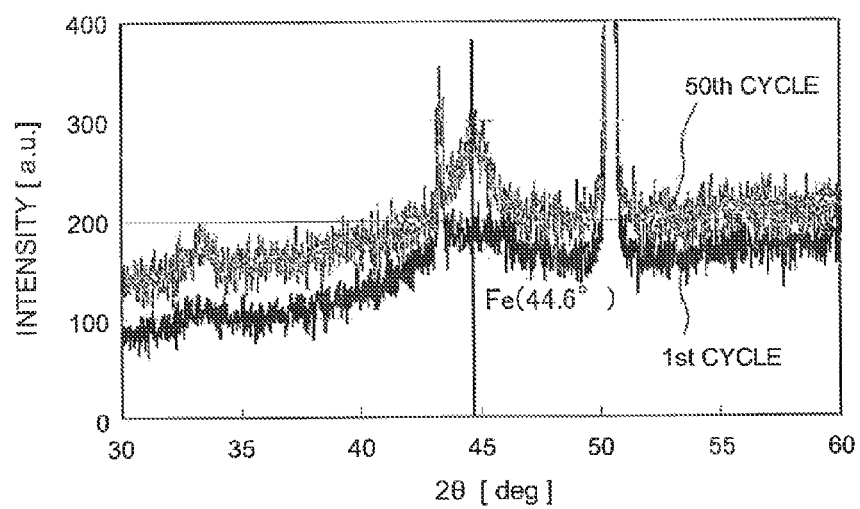
FIG. 8 shows X-ray diffraction measurement results for Sample 2 of the practical example.

As shown in FIG. 7, FIG. 8 and Table 1, in Sample 1 using a polyimide-base resin as the binder, the Fe crystallite sizes differed by 8 Å between the first cycle and the 50th cycle, whereas in Sample 2 using PVdF as the binder a difference of 30 Å occurred between the first cycle and the 50th cycle. From this result it was confirmed that upon using a polyimide-base resin as the binder, there is a considerable effect in suppressing growth of Fe crystallites which may occur in electrode reactions compared with when PVdF is used.

In the above, details of the invention were explained, but the embodiment is merely an example, and the invention disclosed herein includes various modifications and alterations to the above-described specific example.

INDUSTRIAL APPLICABILITY

Figure 9:
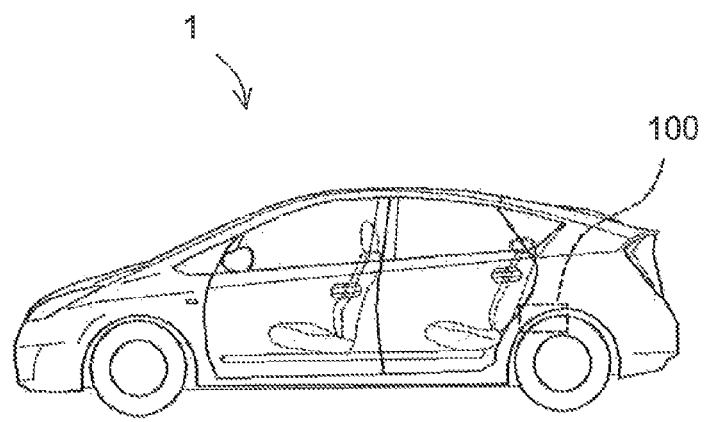
FIG. 9 is a side view schematically showing a vehicle (automobile) comprising the lithium secondary battery of one embodiment.

A lithium secondary battery provided through the technique disclosed herein uses a metal compound as an active material and realizes higher capacity. Moreover, as mentioned above, in such a lithium secondary battery the granular growth of a simple metal which may be produced is suppressed, and superior cycle characteristic (durability) performance is exhibited. Hence use as a lithium secondary battery in various applications is possible. For example, such a lithium secondary battery can be used appropriately as the power source for a motor (electric motor) mounted in an automobile or other vehicle. A plurality of such lithium secondary batteries can also be connected in series and/or in parallel and used as a battery module. Hence through the technique disclosed herein, as shown schematically in FIG. 9, a vehicle (typically an automobile, in particular a hybrid automobile, electric automobile, fuel cell automobile, or other automobile comprising a motor) 1 comprising as a power source such a lithium secondary battery (which can take a battery module) 100, can be provided.

REFERENCE SIGNS LIST

1 Automobile (vehicle)
10 Battery case
12 Case body
14 Lid
20 Electrode assembly (wound electrode assembly)
30 Positive electrode (sheet)
32 Positive electrode collector
34 Positive electrode active material layer
36 Positive electrode active material layer unformed portion
37 Internal positive electrode terminal
38 Positive electrode terminal for external connection
40 Negative electrode (sheet)
42 Negative electrode collector
44 Negative electrode active material layer
46 Negative electrode active material layer unformed portion
47 Internal negative electrode terminal
48 Negative electrode terminal for external connection
50 Separator
100 Lithium secondary battery
110 Button cell

The invention claimed is:

1. A lithium secondary battery comprising:
   electrodes configured in a structure in which an active material layer, including an active material and a binder, is held by collectors; and
   a non-aqueous electrolytic solution,
   wherein
   the active material of at least one of a positive electrode and a negative electrode among the electrodes has an oxide of iron which does not form an alloy with lithium, selected from the group consisting of FeO, $Fe_2O_3$ and $Fe_3O_4$;

the oxide of iron has a particulate shape with a mean particle diameter of each particle of 0.1 μm or more and less than 30 μm based on a laser diffraction type particle size distribution measurement, and the particle consists of the oxide of iron;

an amount of the oxide of iron in the active material layer is 85 mass % or greater where the total weight of the active material layer is 100 mass %; and the binder consists of 100% by mass of a polyimide-base resin.

2. The lithium secondary battery according to claim 1, wherein the oxide of iron is contained in the active material layer having a mean particle diameter from 1 μm to 20 μm.

3. The lithium secondary battery according to claim 1, wherein the oxide or iron is contained in the active material layer having a mean particle diameter from 5 μm to 15 μm.

4. The lithium secondary battery according to claim 1, wherein the oxide of iron has a corundum structure $\alpha$-$Fe_2O_3$.

5. The lithium secondary battery according to claim 1, wherein an imidization rate of the polyimide-base resin is 80% or higher.

6. The lithium secondary battery according to claim 1, wherein a glass transition point of the polyimide-base resin is from 250° C. to 320° C.

7. The lithium secondary battery according to claim 1, wherein an amount of the polyimide-base resin in the active material layer is from 1 mass % to 10 mass % where the total weight of the active material layer is 100 mass %.

* * * * *